(12) United States Patent
Altonen et al.

(10) Patent No.: US 7,837,344 B2
(45) Date of Patent: Nov. 23, 2010

(54) TRADITIONAL-OPENING DIMMER SWITCH HAVING A MULTI-FUNCTIONAL BUTTON

(75) Inventors: Gregory S. Altonen, Easton, PA (US); Samuel F. Chambers, Conshohocken, PA (US); Eric Johnathan Mace, Allentown, PA (US); Matthew J. Ochs, Macungie, PA (US); Louis G. Rollo, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 414 days.

(21) Appl. No.: 11/724,919

(22) Filed: Mar. 16, 2007

(65) Prior Publication Data

US 2007/0216318 A1     Sep. 20, 2007

Related U.S. Application Data

(60) Provisional application No. 60/783,529, filed on Mar. 17, 2006.

(51) Int. Cl.
*F21V 8/00* (2006.01)
*H01H 9/18* (2006.01)

(52) U.S. Cl. .......................... 362/85; 362/27; 362/555; 200/314; 200/331

(58) Field of Classification Search .................. 362/555, 362/85, 95, 27, 558; 200/310–317, 330, 200/331, 332; D13/162
See application file for complete search history.

(56) References Cited

U.S. PATENT DOCUMENTS 1,572,645 A    2/1926    Francesco
3,377,452 A    4/1968    Bock et al.
4,007,348 A    2/1977    VanSon et al.

(Continued)

FOREIGN PATENT DOCUMENTS

EP        1 477 830 A1    11/2004

(Continued)

OTHER PUBLICATIONS

Leviton Manufacturing Co., Inc., Acenti Product Specifications, 2004, 12 pages.

(Continued)

*Primary Examiner*—Stephen F. Husar
*Assistant Examiner*—Peggy A. Neils
(74) *Attorney, Agent, or Firm*—Ostrolenk Faber LLP

(57) ABSTRACT

A load control device, for controlling the amount of power delivered to a electrical load from an AC power source, comprises a user interface adapted to be received in an opening of a traditional-style faceplate and providing a plurality of functionalities on a single control button. A transitory actuation of the control button controls the power delivered to the load. Pulling the control button away from the load control device actuates an air-gap switch to provide an air-gap break in the electrical connection between the source and the load. A linear array of status indicators is provided on a front surface of the control button and displays a visual representation of the amount of power being delivered to the load. A plurality of light pipes are provided inside the control button to conduct the light from a plurality of light-emitting diodes to the front surface of the control button.

51 Claims, 10 Drawing Sheets

U.S. PATENT DOCUMENTS

| | | | |
|---|---|---|---|
| 4,429,201 A | 1/1984 | Dekkers et al. | |
| 4,454,391 A | 6/1984 | Olsson | |
| 4,783,581 A | 11/1988 | Flowers et al. | |
| 4,873,403 A * | 10/1989 | Counts et al. | 200/330 |
| 4,886,946 A | 12/1989 | Franks, Jr. | |
| 4,893,062 A | 1/1990 | D'Aleo et al. | |
| 4,947,054 A | 8/1990 | Flowers et al. | |
| 4,988,840 A * | 1/1991 | Carson et al. | 200/334 |
| 5,017,837 A | 5/1991 | Hanna et al. | |
| 5,030,893 A | 7/1991 | Spira et al. | |
| 5,248,919 A | 9/1993 | Hanna et al. | |
| 5,252,798 A * | 10/1993 | Kamada | 200/314 |
| 5,262,678 A | 11/1993 | Flowers et al. | |
| 5,349,504 A * | 9/1994 | Simms et al. | 362/555 |
| 5,359,231 A | 10/1994 | Flowers et al. | |
| 5,399,940 A | 3/1995 | Hanna et al. | |
| 5,430,356 A | 7/1995 | Ference et al. | |
| 5,608,196 A | 3/1997 | Hall et al. | |
| 5,637,930 A | 6/1997 | Rowen et al. | |
| 5,660,272 A | 8/1997 | Janniere et al. | |
| 5,736,965 A | 4/1998 | Mosebrook et al. | |
| 5,907,395 A | 5/1999 | Schulz et al. | |
| 5,909,087 A | 6/1999 | Bryde et al. | |
| 5,982,103 A | 11/1999 | Mosebrook et al. | |
| 5,988,842 A * | 11/1999 | Johnsen et al. | 362/551 |
| 6,011,883 A | 1/2000 | Davis et al. | |
| 6,018,132 A | 1/2000 | Chen | |
| 6,114,644 A | 9/2000 | Nishikawa | |
| 6,169,377 B1 | 1/2001 | Bryde et al. | |
| 6,210,010 B1 | 4/2001 | Pontetti et al. | |
| 6,300,727 B1 | 10/2001 | Bryde et al. | |
| 6,333,479 B1 | 12/2001 | Tai | |
| 6,380,696 B1 | 4/2002 | Sembhi et al. | |
| 6,545,434 B2 | 4/2003 | Sembhi et al. | |
| 6,727,446 B1 | 4/2004 | Mayo et al. | |
| 6,734,381 B2 | 5/2004 | Mayo et al. | |
| 6,798,341 B1 | 9/2004 | Eckel et al. | |
| 6,948,840 B2 * | 9/2005 | Grenda et al. | 362/555 |
| 7,126,070 B2 | 10/2006 | Endres et al. | |
| 7,170,018 B2 | 1/2007 | Ilkhanov | |
| 7,190,125 B2 | 3/2007 | McDonough et al. | |
| D546,775 S * | 7/2007 | Mayo et al. | D13/162 |
| 7,329,034 B2 * | 2/2008 | Verdes et al. | 362/555 |
| 7,335,845 B2 | 2/2008 | Johnsen et al. | |
| 7,361,853 B2 | 4/2008 | Clegg et al. | |
| 7,414,210 B2 | 8/2008 | Clegg et al. | |
| 7,432,460 B2 | 10/2008 | Clegg et al. | |
| 7,432,463 B2 | 10/2008 | Clegg et al. | |
| 2003/0089587 A1 | 5/2003 | Mayo et al. | |
| 2004/0207343 A1 | 10/2004 | Novikov | |
| 2005/0184677 A1 | 8/2005 | Johnsen et al. | |
| 2005/0280598 A1 | 12/2005 | Webb et al. | |
| 2005/0284738 A1 | 12/2005 | Altonen et al. | |
| 2006/0255959 A1 | 11/2006 | Salvestrini | |
| 2006/0272569 A1 | 12/2006 | Lehmer et al. | |
| 2006/0273970 A1 | 12/2006 | Mosebrook et al. | |
| 2007/0193863 A1 * | 8/2007 | Wu | 200/61.72 |
| 2008/0001549 A1 | 1/2008 | Altonen et al. | |
| 2008/0278297 A1 * | 11/2008 | Steiner et al. | 340/310.17 |

FOREIGN PATENT DOCUMENTS

| | | |
|---|---|---|
| GB | 859 486 A | 1/1961 |
| WO | WO 2006/004879 | 1/2006 |

OTHER PUBLICATIONS

Leviton Manufacturing Co., Inc., Acenti Installation Instructions, 2004, 2 pages.
Cooper Wiring Devices, Aspire Brochure, 2004, 12 pages.

* cited by examiner

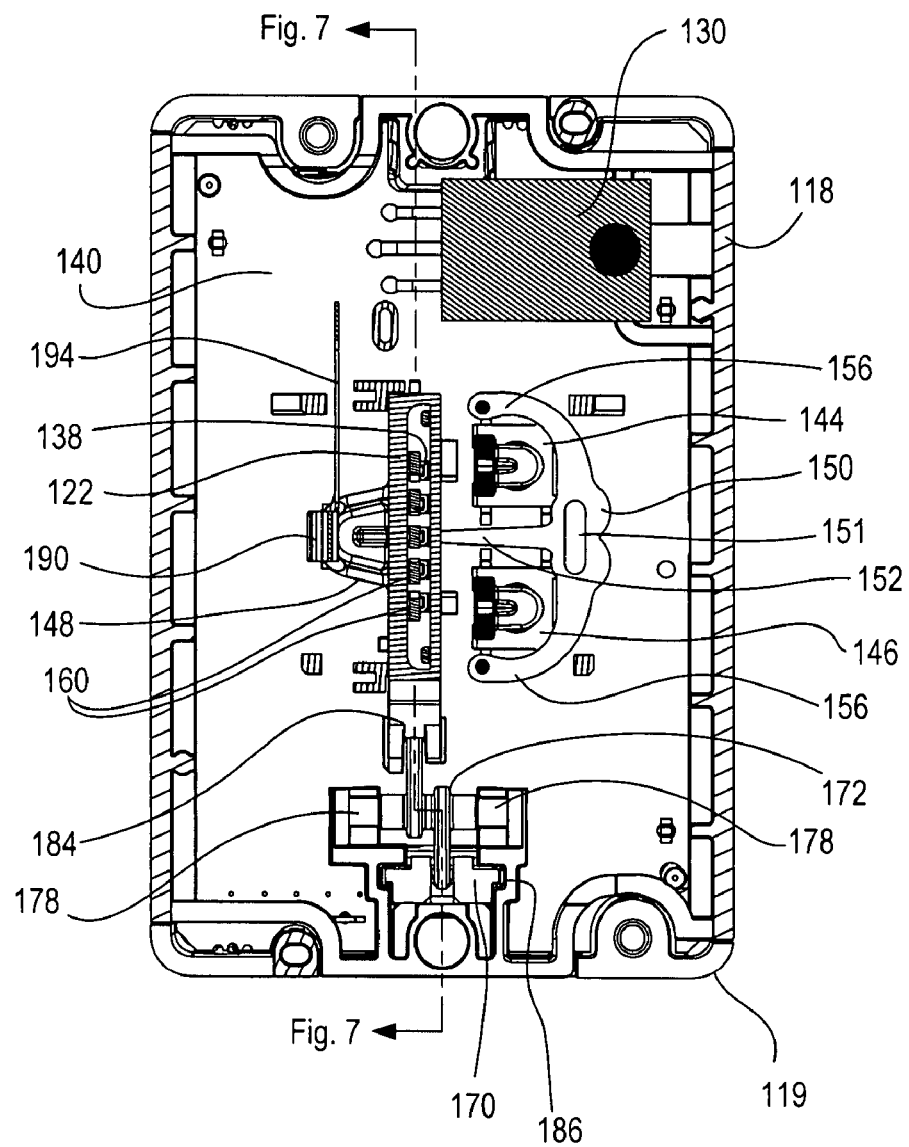
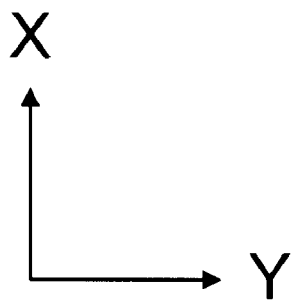
Fig. 6

TRADITIONAL-OPENING DIMMER SWITCH HAVING A MULTI-FUNCTIONAL BUTTON

RELATED APPLICATIONS

This application claims priority to commonly-assigned U.S. Provisional Application Ser. No. 60/783,529, filed Mar. 17, 2006, entitled LOAD CONTROL DEVICE HAVING A BUTTON WITH A LINEAR ARRAY OF STATUS INDICATORS, the entire disclosure of which is hereby incorporated by reference.

BACKGROUND OF THE INVENTION

1. Field of the Invention

The present invention relates to a load control device for controlling the intensity of a lighting load, specifically a traditional-opening dimmer switch having a single button that causes the load control device to toggle the lighting load when the button is depressed and released, actuates an air-gap switch when the button is pulled out, and provides a visual display that illuminates to display a representation of the intensity of the lighting load when the load is on and a night light when the load is off.

2. Description of the Related Art

A conventional wall-mounted load control device is mounted to a standard electrical wallbox and is connected in series electrical connection with an electrical load. Standard load control devices, such as dimmer switches and motor speed controls, use one or more semiconductor switches, such as triacs or field effect transistors (FETs), to control the current delivered from an alternating-current (AC) power source to the load, and thus, the intensity of the lighting load or the speed of the motor.

Wall-mounted load control devices typically include a user interface having a means for adjusting the intensity or the speed of the load, such as a linear slider, a rotary knob, or a rocker switch. Some load control devices also include a button that allows for toggling of the load between off (i.e., no power is conducted to the load) and on (i.e., power is conducted to the load). It is often desirable to include a plurality of status indicators, such as light-emitting diodes (LEDs), on the user interface to indicate the intensity or speed of the load.

FIG. 1 shows the user interface of a prior art dimmer switch 10 having a plurality of status indicators 20. As shown, the dimmer switch 10 includes a faceplate 30 (i.e., a cover plate), a frame 32, an enclosure 34, a toggle button 40, and an intensity selection actuator 50 for selecting a desired level of light intensity of an associated lighting load controlled by the dimmer switch. The button 40 comprises an infrared (IR) lens 60 for receiving IR signals transmitted from an external IR transmitter (not shown) to control the intensity of the connected lighting load. The dimmer switch 10 further comprises an air-gap switch actuator 70 for actuating an air-gap switch inside the dimmer switch to provide an actual air-gap break in the electrical connection between the source and the load.

Pressing the button 40 causes the associated lighting load to toggle from on to off, or vice versa. Actuation of the upper portion of intensity selection actuator 50 increases or raises the light intensity of the lighting load, while actuation of the lower portion of actuator 50 decreases or lowers the light intensity. The intensity levels of the lighting load may range from a minimum intensity level, which is preferably the lowest visible intensity, but may be zero, or "full off," to a maximum intensity level, which is typically "full on." Light intensity level is typically expressed as a percent of full intensity. Thus, when the lighting load is on, the light intensity level may range from 1% to 100%.

The dimmer switch 10 also includes an intensity level indicator in the form of the plurality of status indicators 20 located on the frame 32. The status indicators 20 may be arranged in an array (such as a linear array as shown) representative of a range of light intensity levels of the lighting load being controlled. The linear array of status indicators 20 represents a linear scale (between off and full intensity of the associated lighting load), such that one of the status indicators is illuminated to indicate the intensity of the lighting load. For example, if the dimmer switch 10 is controlling the lighting load to 50%, the middle status indicator will be illuminated, since this status indicator is at the midpoint of the linear array of the status indicators 20.

Another example of a dimmer switch having a linear array of status indicators is described in U.S. Pat. No. 5,248,919, issued Sep. 28, 1993, entitled LIGHTING CONTROL DEVICE, the entire disclosure of which is hereby incorporated by reference.

In order to keep the pressure required to actuate the toggle button less than the maximum comfortable pressure for a human finger, it is desirable to maximize the front surface area of the toggle button. Therefore, there is a need for a traditional-style dimmer switch that comprises a button having a maximum surface area, while still providing all of the functionality and features of the prior art dimmer switch 10, i.e., the toggle functionality of the toggle button 40, the air-gap actuator 70, and the linear array of status indicators 20.

SUMMARY OF THE INVENTION

According to the present invention, a load control device for controlling the amount of power delivered to an electrical load from an AC power source comprises a controllably conductive device, an air-gap switch, a controller, a control actuator, and a visual display provided on the front surface of the control actuator. The controllably conductive device is operable to be coupled in series electrical connection between the AC power source and the electrical load. The controllably conductive device having a control input for controlling the controllably conductive device between a non-conductive state and a conductive state. The air-gap switch is coupled in series electrical connection with the controllably conductive device, such that the air-gap switch is operable to electrically connect the AC power source and the electrical load through the controllably conductive device when the air-gap switch is in a closed state and operable to provide an air-gap break between the AC power source and the electrical load when the air-gap switch is in an open state. The controller is operatively coupled to the control input of the controllably conductive device for controlling the controllably conductive device between the non-conductive state and the conductive state. The control actuator is adapted to be provided in an opening of a traditional-style faceplate and to extend beyond a front surface of the faceplate. The controller is operable to control the amount of power delivered to the electrical load in response to an actuation of the control actuator. The control actuator is further coupled to the air-gap switch to control the air-gap switch between the closed state and the open state. The controller operable to control the visual display to display a representation of the amount of power being delivered to the electrical load.

According to a second embodiment of the present invention, a load control device for controlling the amount of power delivered to an electrical load from an AC power source comprises an actuator having a front surface and a linear array of status indicators located on the front surface of the actuator. The actuator is adapted to be provided in an opening of a traditional-style faceplate. The load control device is operable to control the amount of power delivered to the load in response to an actuation of the actuator.

The present invention further provides a light pipe structure for conducting light from a plurality of discrete sources. The light pipe structure comprises a continuous front surface, and a plurality of light pipes coupled to the continuous front surface. The light pipes are each operable to conduct the light from one of the discrete sources to the front surface. The light pipe structure provides optical coupling between the light pipes to provide a diffusion of the light from the discrete sources at the front surface.

In addition, the present invention provides an air-gap switch assembly comprising first and second switch contacts, an air-gap shaft, and an air-gap actuator. The first and second switch contacts are electrically connected in a closed state. The air-gap shaft is operable to move along a first axis of travel and cause the air-gap switch to enter an open state in which the switch contacts are not electrically connected. The air-gap actuator is operable to move along a second axis of travel, which is displaced in an orthogonal direction from the first axis of travel. The air-gap shaft is coupled to the actuator such that the air-gap shaft is operable to move along the first axis of travel when the actuator is moved along the second axis of travel.

According to another aspect of the present invention, a load control device for controlling the amount of power delivered to an electrical load from an AC power source comprises a controllably conductive device, an air-gap switch, a controller, and control actuator. The controllably conductive device is operable to be coupled in series electrical connection between the AC power source and the electrical load. The controllably conductive device has a control input for controlling the controllably conductive device between a non-conductive state and a conductive state. The air-gap switch is coupled in series electrical connection with the controllably conductive device and operable to be coupled in series electrical connection between the AC power source and the electrical load. The air-gap switch is operable to electrically connect the AC power source and the electrical load through the controllably conductive device when the air-gap switch is in a closed state and provide an air-gap break between the AC power source and the electrical load when the air-gap switch is in an open state. The controller is operatively coupled to the control input of the controllably conductive device for controlling the controllably conductive device between the non-conductive state and the conductive state. The control actuator is adapted to be provided in an opening of a traditional-style faceplate and to extend beyond a front surface of the faceplate. The controller is operable to control the amount of power delivered to the electrical load in response to a first actuation of the control actuator. The control actuator is further coupled to the air-gap switch to control the air-gap switch between the closed state and the open state in response to a second actuation of the control actuator. The second actuation is characterized by a greater force and a greater displacement of the control actuator than the first actuation.

The present invention further provides a control structure for controlling the power to be applied to an electrical system from an AC power source. The control structure comprises a cover plate, a first rectangular depressible control button, a second rectangular depressible power-increase button, a third rectangular depressible power-decrease button, and a support frame supporting the first, second, and third buttons. The cover plate defines a rectangular opening having a length and a width. The first button is coupleable to the electrical system to turn the system on and off. The first button is disposed adjacent one side of the length of the rectangular opening in the cover plate. The first button fills the length of the rectangular opening and about one half the width of the rectangular opening in the cover plate. The second button is coupleable to the electrical system to increase the power applied to the electrical system, while the third button is coupleable to the electrical system to decrease the power applied to the electrical system. The second and third buttons are arranged lengthwise adjacent one another within the remaining half of the width of the rectangular opening in the cover plate and extend for the length of the rectangular opening, such that the first, second, and third buttons fill the full area of the rectangular opening in the cover plate.

According to another embodiment of the present invention, the control structure further comprises an air-gap switch connected in series with the electrical system, and an operating mechanism connected between the air-gap switch and the first button. The operating mechanism includes a centrally pivoted lever having a first end coupled to the air-gap switch and a second end connected to the first button. The pressing in of the first button toward the cover plate closes the air-gap switch and the pulling out of the first button away from the cover plate opens the air-gap switch.

According to yet another embodiment of the present invention, a control structure for controlling the power to be applied to an electrical system comprises a cover plate containing a rectangular opening, a support frame, a power control actuator, and a linear illumination array. The support frame supports a rectangular control button which is coupleable to the electrical system and manually movable for toggling the electrical system on and off in response to operation of the rectangular control button. The power control actuator is fixed relative to the cover plate and is coupleable to and manually operable to control the power applied to the electrical system. The linear illumination array is disposed along the center of the surface of the rectangular control button and is electrically energized from the electrical system to produce a visual output along its length. The visual output is related to the amount of power transmitted to the electrical system in response to an actuation of the power control actuator.

In addition, the present invention provides a control button for controlling a variable output power system and for indicating a power level of the power system. The control button comprises a rectangular front operating surface, which is operable by a user, an elongated hollow light-conducting body, a central elongated illumination display in the rectangular front surface and bisecting the surface thereof. The control button is coupleable to the electrical system for switching the electrical system on and off responsive to operations thereof, and the illumination display is illuminated at given locations along the length thereof to display the scale value of the actual power level of the power system.

The present invention further provides a load control device for controlling and indicating the amount of power delivered to a load from a source of AC power. The load control device comprises an actuator having a front surface operable by a user, and a linear array of power level status indicators located on the front surface of the actuator and coupleable to the load to indicate the amount of power delivered to the load. The load control device is operable to control and indicate to the user the amount of power delivered to the load in response to an actuation of the actuator.

According to another aspect of the present invention, an operating mechanism is provided for an air-gap switch in a wall-mounted load control device for controlling the power delivered from an AC power source to an electrical load. The air-gap switch is adapted to be coupled in series between the AC power source and the electrical load. The air-gap switch comprising a flexible switch leaf contact movable into and out of engagement with a cooperating contact and biased toward engagement with the cooperating contact. The operating mechanism comprises a push-pull button, a centrally pivoted lever, and a cam. The push-pull button is slidably mounted in a support and extends beyond an outer surface of the load control device. The push-pull button is operable to be pressed inward or pulled outward by a user. The centrally pivoted lever has a first end coupled to the push-pull button and a second end. The cam is connected to the second end of the lever and is being movable to separate the leaf spring contact from its the cooperating contact when push-pull button is pulled out by the user and to permit the leaf spring contact to press into contact with the cooperating contact when the push-pull button is pushed in by the user.

The present invention further provides a control structure for an electrical circuit for controlling the power to be applied to an electrical system from an AC power source. The control structure comprises a toggle button, a support structure, a light pipe, at least one light-emitting diode, and a circuit for energizing the at least one light-emitting diode when the electrical circuit is off. The toggle button has a rectangular hollow plastic body with a translucent outer top surface. The support structure supports the toggle button for linear motion between first and second positions related to switch on and switch off positions. The light pipe structure is supported within the hollow plastic body of the toggle button. The light pipe structure has a first end surface facing the interior surface of the translucent outer top surface and a second end surface opposite to the first end surface. The at least one light-emitting diode faces the second end surface for illuminating the second end surface whereby the light illumination on the second end surface is conducted to the first end surface to illuminate the translucent outer top surface.

Other features and advantages of the present invention will become apparent from the following description of the invention that refers to the accompanying drawings.

DESCRIPTION OF THE DRAWINGS

FIG. 6 is a front cross-sectional view of the dimmer switch of FIG. 2;

DETAILED DESCRIPTION OF THE INVENTION

Figure 1:
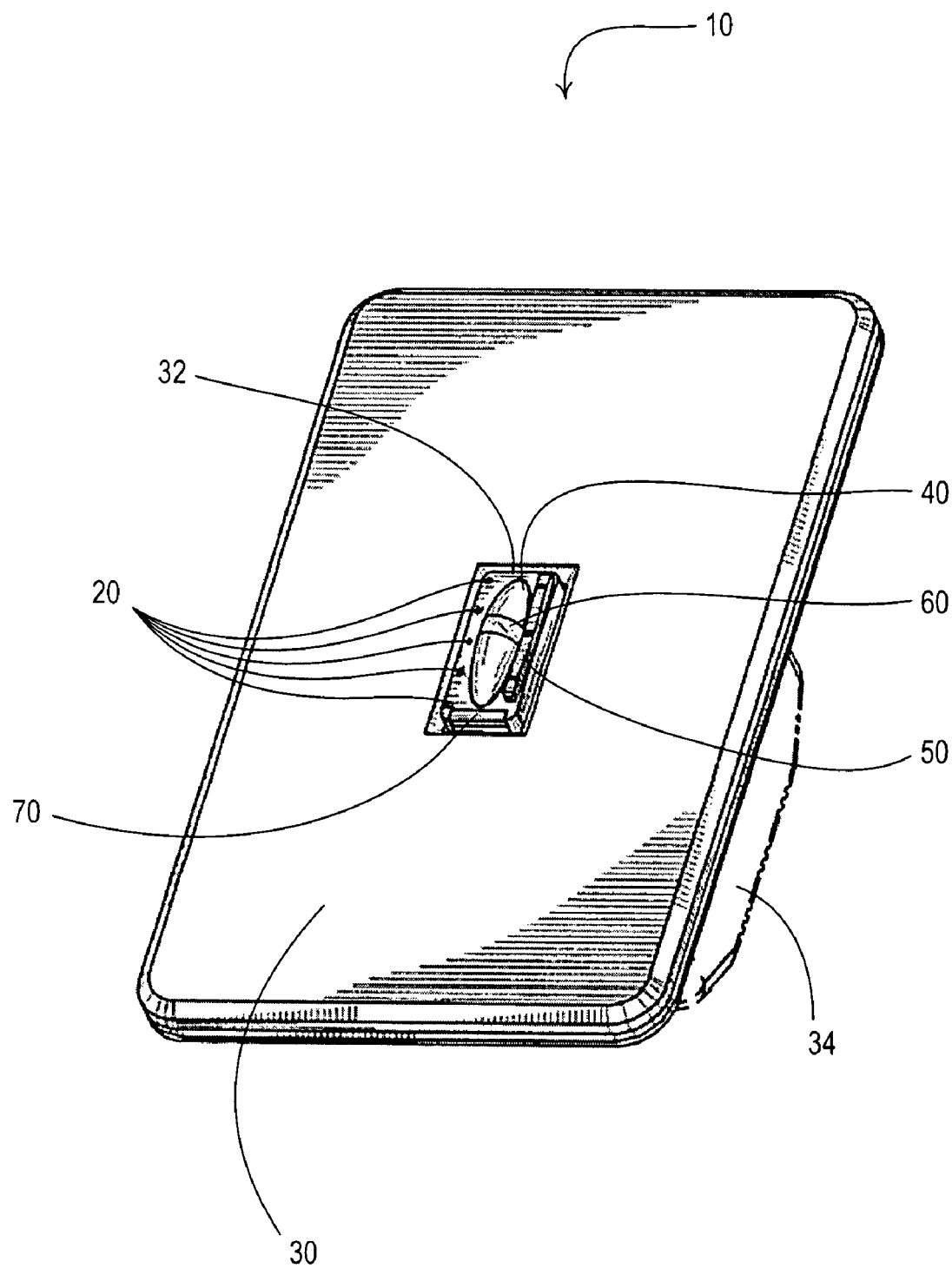
FIG. 1 shows the user interface of a prior art dimmer switch having a plurality of dictators.

The foregoing summary, as well as the following detailed description of the preferred embodiments, is better understood when read in conjunction with the appended drawings. For the purpose of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
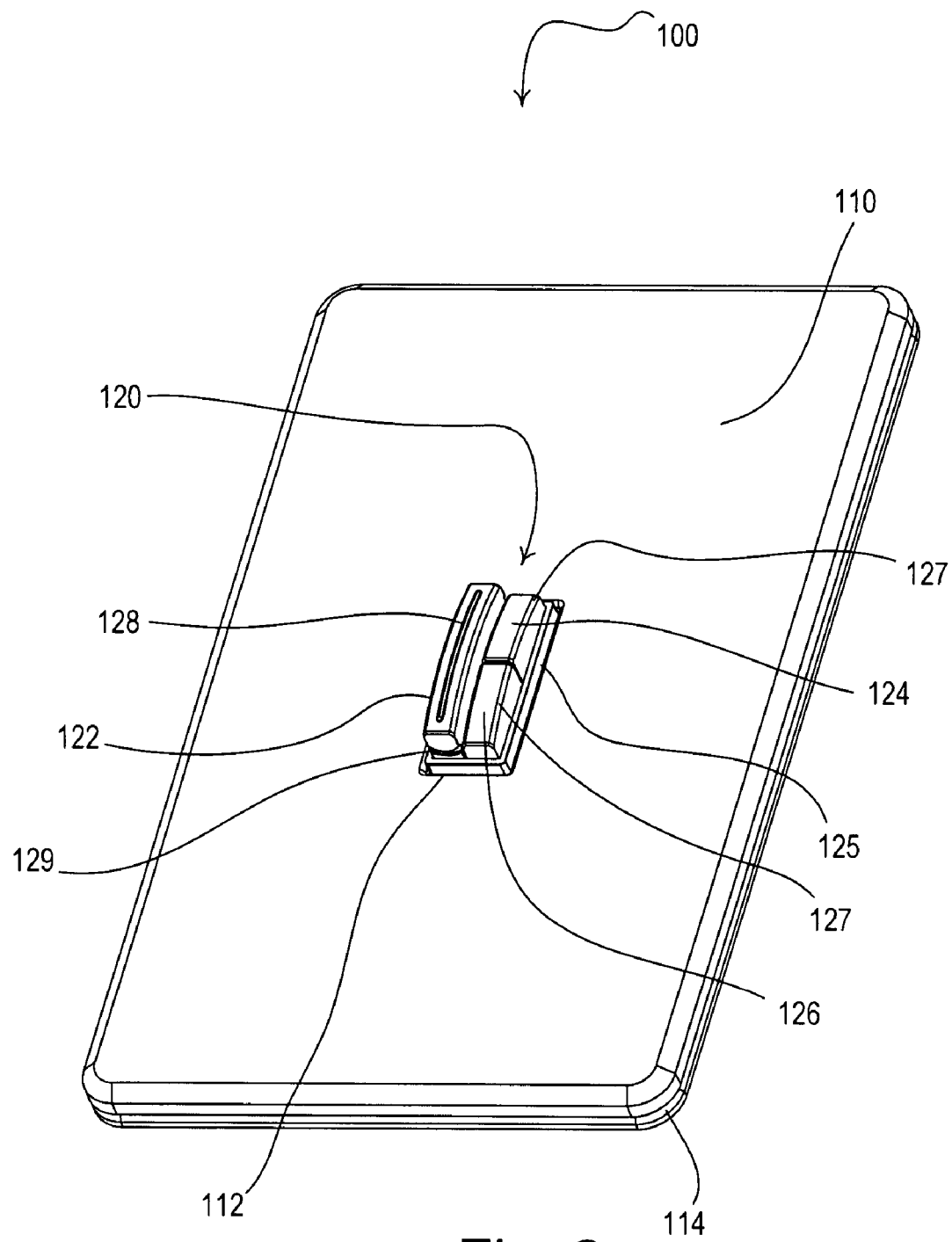
FIG. 2 is a perspective view of a dimmer switch according to the present invention.
Figure 3:
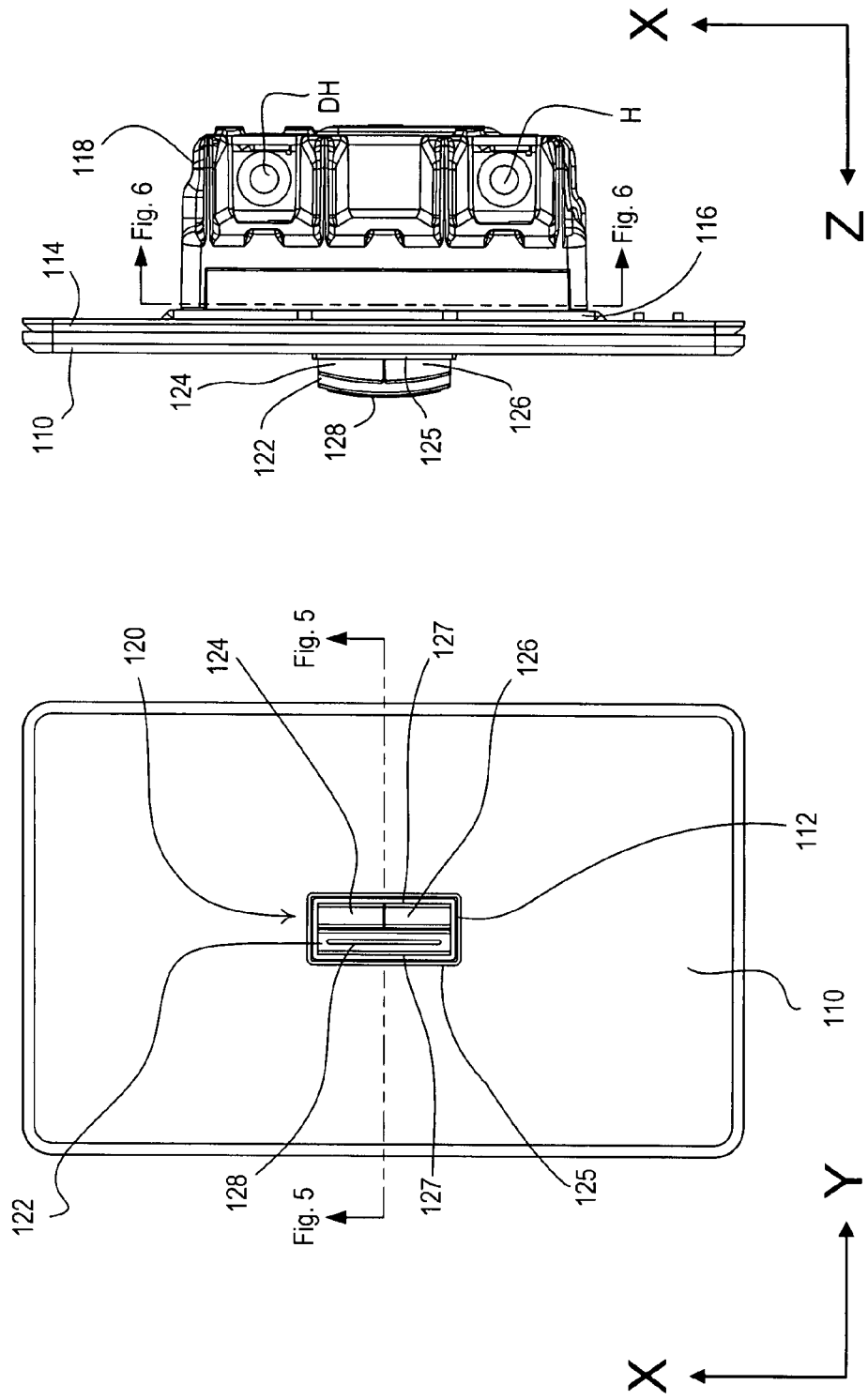
FIGS. 3A and 3B are front and right-side views, respectively, of the dimmer switch of FIG. 2.
Figure 5:
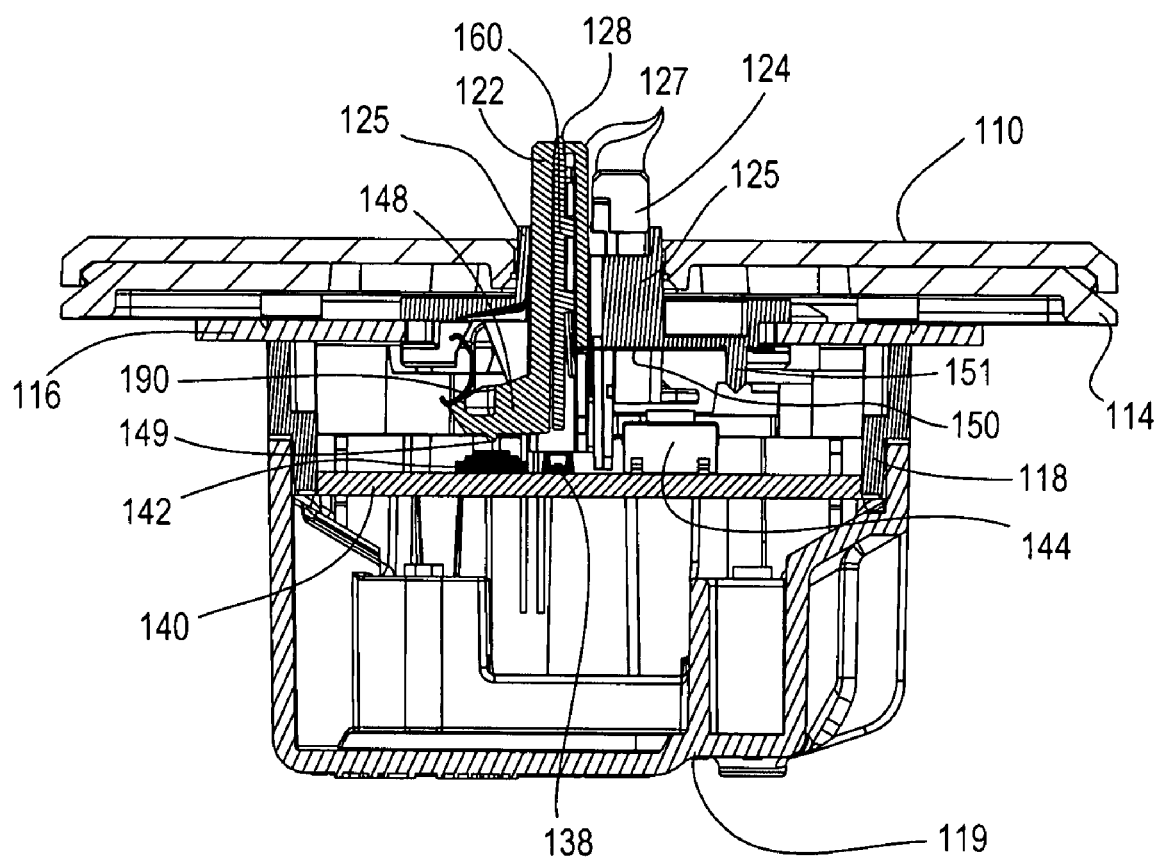
FIG. 5 is a bottom cross-sectional view of the dimmer switch of FIG. 2.

FIG. 2 is a perspective view of a dimmer switch 100 according to the present invention. FIG. 3A is a front view and FIG. 3B is a right-side view of the dimmer switch 100. The dimmer switch 100 comprises a faceplate 110 (i.e., a cover plate) having a traditional-style opening 112. Per the standards set by the National Electrical Manufacturers Association (NEMA), the traditional-style opening 112 has a length in the longitudinal direction (i.e., in the direction of the X-axis as shown in FIG. 3A) of 0.925" and a width in the lateral direction (i.e. in the direction of the Y-axis) of 0.401" (NEMA Standards Publication No. WD6, 2001, p. 7). The faceplate 110 is connected to an adapter 114, which is attached to a yoke 116. The yoke allows the dimmer switch 110 to be mounted to a standard electrical wall-box (not shown). The electrical circuitry of the dimmer switch 110, which will be described in greater detail below, is housed in a back enclosure, which comprises a ring portion 118 and a back cover portion 119 (FIG. 5).

The dimmer switch 100 comprises a user interface 120 having three depressible rectangular actuators: a control actuator 122 (i.e. a control button), a raise actuator 124 (i.e., a power-increase button), and a lower actuator 126 (i.e., a power-decrease button). The front surface of the control actuator 122 has a positive curvature, while the front surfaces of the raise actuator 124 and the lower actuator 126 appear to form a single continuous surface having a positive curvature above the plane of the faceplate 110 as shown in FIG. 3B. The control actuator 122, raise actuator 124, and lower actuator 126 have length-wise edges 127 that are chamfered.

The dimmer switch 100 further comprises a support frame 125. The support frame 125 defines a thin shroud surrounding the control actuator 122, the raise actuator 124, and the lower actuator 126. The thin shroud of the frame 125 prevents the buttons from binding with the edges of the opening 112 of the faceplate 110 due to a planar displacement of the faceplate relative to the frame.

Figure 4:
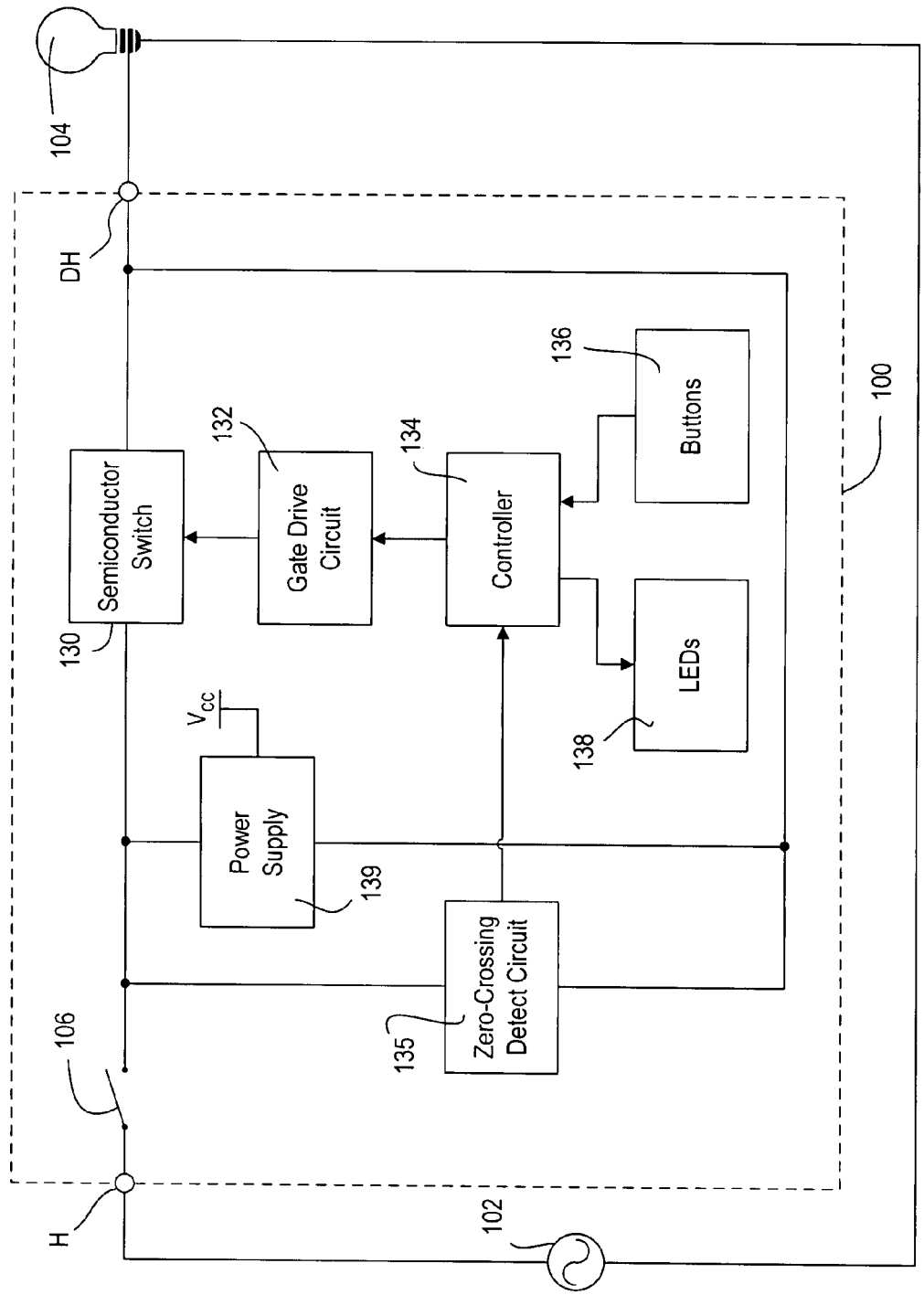
FIG. 4 is a simplified block diagram of the dimmer switch of FIG. 2.

In response to transitory actuations of the control actuator 122 (i.e., comprising a press and a release of the control actuator), the dimmer switch 110 is operable to provide a first functionality. Specifically, actuations of the control actuator 122 cause the dimmer switch 110 to toggle, i.e., turn off and on, a connected electrical load, for example, a lighting load 104 (FIG. 4). Further, actuations of the raise actuator and the lower actuator cause the dimmer switch 100 to raise and lower the intensity of the connected lighting load, respectively. The functionality of the dimmer switch 110 in response to transitory actuations of the control actuator 122, the raise button 124, and the lower button 126 is described in greater detail in the '919 patent.

The control actuator 122 is further operable to provide a second functionality to actuate (i.e., open) an air-gap switch 106 (FIG. 4) inside the back enclosure of the dimmer switch 100. A user is able to pull the control actuator 122 outwards from the dimmer switch 100 (i.e., away from the front surface of the faceplate 110) in order to actuate the air-gap switch 106. The control actuator 122 is provided with fingernail grooves 129 on the top and bottom surfaces to allow the user to grasp and pull out the control actuator. The control actuator 122 is maintained in a pulled-out state while the air-gap switch 106 is open. The user is able to push the control actuator 122 back in towards the dimmer switch 100 to once again close the air-gap switch 106.

The dimmer switch 100 further comprises a status indicator lens 128 on the control actuator 122. The status indicator lens 128 comprises a continuous front surface for providing a visual display in the form of a linear illumination array of status indicators on the front surface of the control actuator 122. The status indicator lens 128 is substantially transparent such that the lens is operable to transmit the light from a plurality of discrete light sources inside the dimmer switch 100 to the front surface of the control actuator 122. The discrete light sources preferably comprise light-emitting diodes (LEDs) 138 (FIG. 4). One or more of the individual LEDs 138 illuminates to indicate the intensity level of the connected lighting load, which is described in greater detail in the '919 patent. Alternatively, the dimmer 100 may comprise a plurality of status indicator lenses on the front surface of the control actuator 122, for example, one status indicator lens for each LED 138.

FIG. 4 is a simplified block diagram of the dimmer switch 100 of the present invention. The dimmer switch 100 has a hot terminal H connectable to an AC power source 102 and a dimmed hot terminal DH connectable to an electrical load, such as a lighting load 104 or a motor load. The dimmer switch 100 employs a controllably conductive device, e.g., a bidirectional semiconductor switch 130, coupled between the hot terminal H and the dimmed hot terminal DH to control the current through, and thus the intensity of, the lighting load 204. The semiconductor switch 130 has a control input (or gate), which is connected to an output of a gate drive circuit 132. A control signal applied to the input to the gate will render the semiconductor switch 130 conductive or non-conductive, which in turn controls the power supplied to the lighting load 104. The semiconductor switch 130 may comprise a triac, a field effect transistor (FET) or an insulated gate bipolar transistor (IGBT) in a full-wave rectifier bridge, two FETs or two IGBTs in anti-series connection, or any other suitable type of bidirectional semiconductor switch.

The gate drive circuit 132 provides control inputs to the semiconductor switch 130 in response to command signals from a controller 134. The controller 134 is preferably implemented as a microprocessor, but may be any suitable controller, such as a programmable logic device (PLD), a microcontroller, or an application specific integrated circuit (ASIC). A zero-crossing detect circuit 135 determines the zero-crossing points of the AC source voltage from the AC power supply 102. A zero-crossing is defined as the time at which the AC supply voltage transitions from positive to negative polarity, or from negative to positive polarity, at the beginning of each half-cycle. The zero-crossing information is provided as an input to the controller 134. The controller 134 generates the gate control signals to operate the semiconductor switch 130 to thus provide voltage from the AC power supply 102 to the lighting load 104 at predetermined times relative to the zero-crossing points of the AC waveform. The dimmer switch 100 further comprises a power supply 139 to generate a direct-current (DC) voltage $V_{CC}$ to power the controller 134.

The controller 134 receives user inputs from a plurality of buttons 136, i.e., the control actuator 122, the raise actuator 124, and the lower actuator 126 of the user interface 120 of the dimmer switch 100. The controller 134 is operable to control the semiconductor switch 130 to provide a desired intensity of the lighting load 204 in response to the inputs received from the buttons 136. The controller 134 generates command signals to drive the LEDs 138, and thus the linear array of status indicators at the front surface of the control actuator 122, i.e., on the status indicator lens 128. The controller 134 illuminates one or more of the LEDs 138 to indicate the desired intensity of the lighting load 204.

The air-gap switch 106 is coupled in series between the hot terminal H and the semiconductor switch 130. The air-gap switch 106 has a normally-closed state in which the semiconductor switch 130 is coupled in series electrical connection between the AC power source 102 and the electrical load 104. When the air-gap switch 106 is actuated (i.e., in an open state), the air-gap switch provides an actual air-gap break between the AC power source 102 and the electrical load 104. The air-gap switch 106 allows a user to service the lighting load 104 without the risk of electrical shock.

Figure 7:
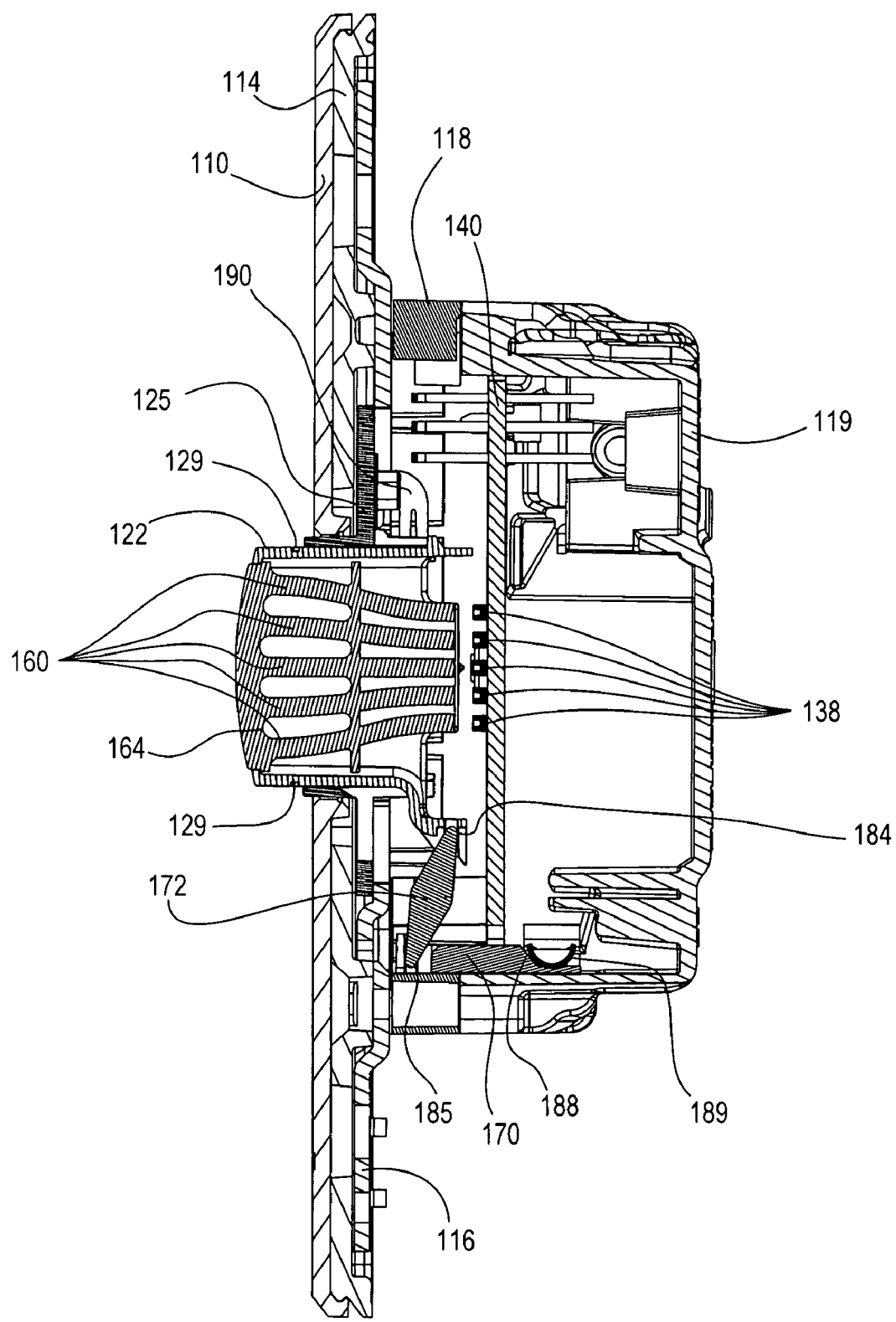
FIG. 7 is a right-side cross-sectional view of the dimmer switch of FIG. 2.

FIG. 5 is a bottom cross-sectional view, FIG. 6 is a front cross-sectional view, and FIG. 7 is a right-side cross-sectional view of the dimmer switch 110. As shown in FIGS. 5 and 7, the control actuator 122, the raise button 124, and the lower button 126 extend through the frame 125 beyond the front surface of the faceplate 110. The control actuator 122 is operable to move towards and away from the front surface of the faceplate 110 along a first axis of travel. The electrical circuitry of the dimmer switch 110 (i.e., the semiconductor switch 130, the gate drive circuit 132, the controller 134, the zero-crossing detect circuit 135, the buttons 136, the LEDs 138, and the power supply 139) is coupled to a printed circuit board (PCB) 130, which is mounted in the back enclosure of the dimmer switch 100. The LEDs 138 (e.g., five LEDs) are mounted to the PCB 150 in a linear array directly below the control actuator 122, such that the LEDs are operable to illuminate the status indicator lens 128. The LEDs 138 may be, for example, part number TLMG2100GS08 manufactured by Vishay Intertechnology, Inc.

The buttons 136 comprise a control tactile switch 142, a raise tactile switch 144, and a lower tactile switch 146, which are actuated by the control actuator 122, the raise actuator 124, and the lower actuator 126, respectively. The control actuator 122 comprises an extension 148 having an actuator knob 149 for contacting the control tactile switch 142. Accordingly, the control tactile switch 142 is located at a lateral distance from the axis of movement (i.e., the center) of the control actuator 122, such that the LEDs 138 can be mounted directly behind the control actuator 122. Only a low-force actuation is required to displace the control actuator 122 a short distance to actuate the control tactile switch 142.

A button return spring 150 is mounted to the rear side of the frame 125 and is ultrasonically-staked or heat-staked to the frame via a post 151. The button return spring 150 comprises a first leg 152, a second leg 154, and a third leg 156, for causing the control actuator 122, the raise button 124, and the lower button 126, respectively, to return to the normal state after a transitory actuation of any of the buttons. For example, the first leg 152 of the button return spring 150 contacts a notch 159 (FIG. 9B) in the control actuator 122.

Figure 8:
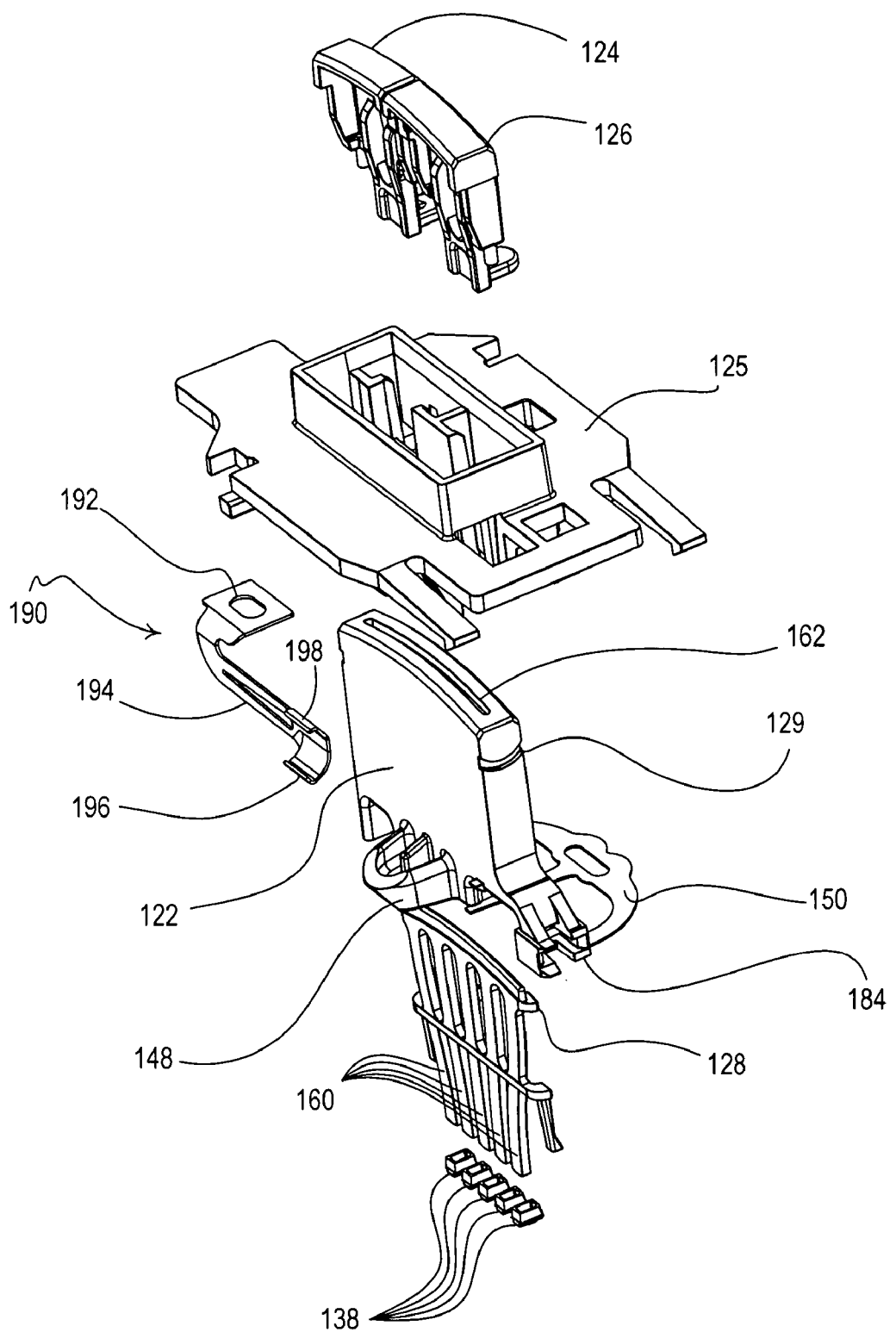
FIG. 8 is an exploded view of the assembly of a control button and a status indicator lens of the dimmer switch of FIG. 2.

FIG. 8 is an exploded view of the assembly of the control actuator 122, the raise button 124, the lower button 126, and the status indicator lens 128. A light pipe structure, i.e., the status indicator lens 128 and a plurality of light pipes 160, is received within the control actuator 122. For example, there are five light pipes 160 as shown in FIGS. 5-8, such that there is one light pipe for each of the LEDs 138. Each one of the LEDs 138 is mounted adjacent the end of one of the light pipes 160. The light pipes 160 extend through the control actuator 122 and the status indicator lens 128 protrudes through an elongated opening 162 in the front surface of the control actuator. The light pipes 160 conduct the light emitted by the LEDs 138 to the front surface of the control actuator 122. The light pipes 160 are designed such that there is little or no bleeding of the light between the light pipes. For example, if the fourth LED 138 is illuminated, the light shines through the fourth light pipe 160 to illuminate a portion of the front surface of the status indicator lens 128 above the fourth light pipe.

Preferably, the tops of the light pipes 160 merge with one another at the front surface of the status indicator lens 128 over concave curvatures, e.g., rounds 164. As a result, the light conducted by each of the light pipes 160 is diffused slightly across the front surface of the status indicator lens 128, which produces an aesthetically-pleasing effect by increasing the uniformity of the illumination across the front surface of the status indicator lens 128. The rounds 164 preferably have a radius of 0.038". When one of the LEDs 138 is illuminated, the status indicator lens 128 displays a pinpoint of illumination above the light pipe 160 of the illuminated LED surrounded by an area having gradually decreasing illumination. Preferably, the cross-sectional areas of the light pipes 160 increase from the base of the light pipes to the status indicator lens 128, such that the light pipes have dimensions of 0.065" by 0.030" near the base and 0.067" by 0.030" near the status indicator lens.

Figure 9A:
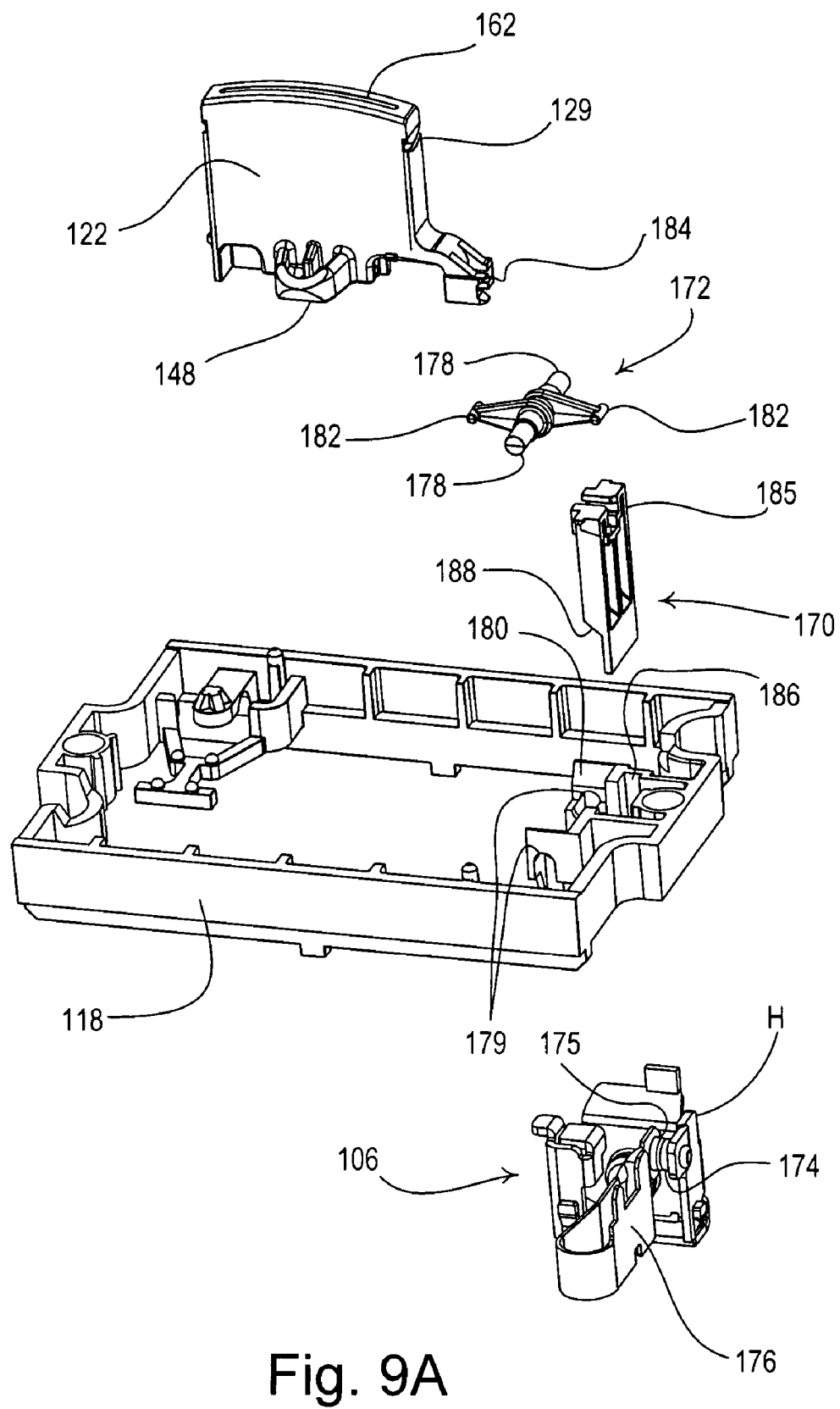
FIGS. 9A and 9B are first and second exploded views of the air-gap actuator assembly of the dimmer switch of FIG. 2.
Figure 9B:
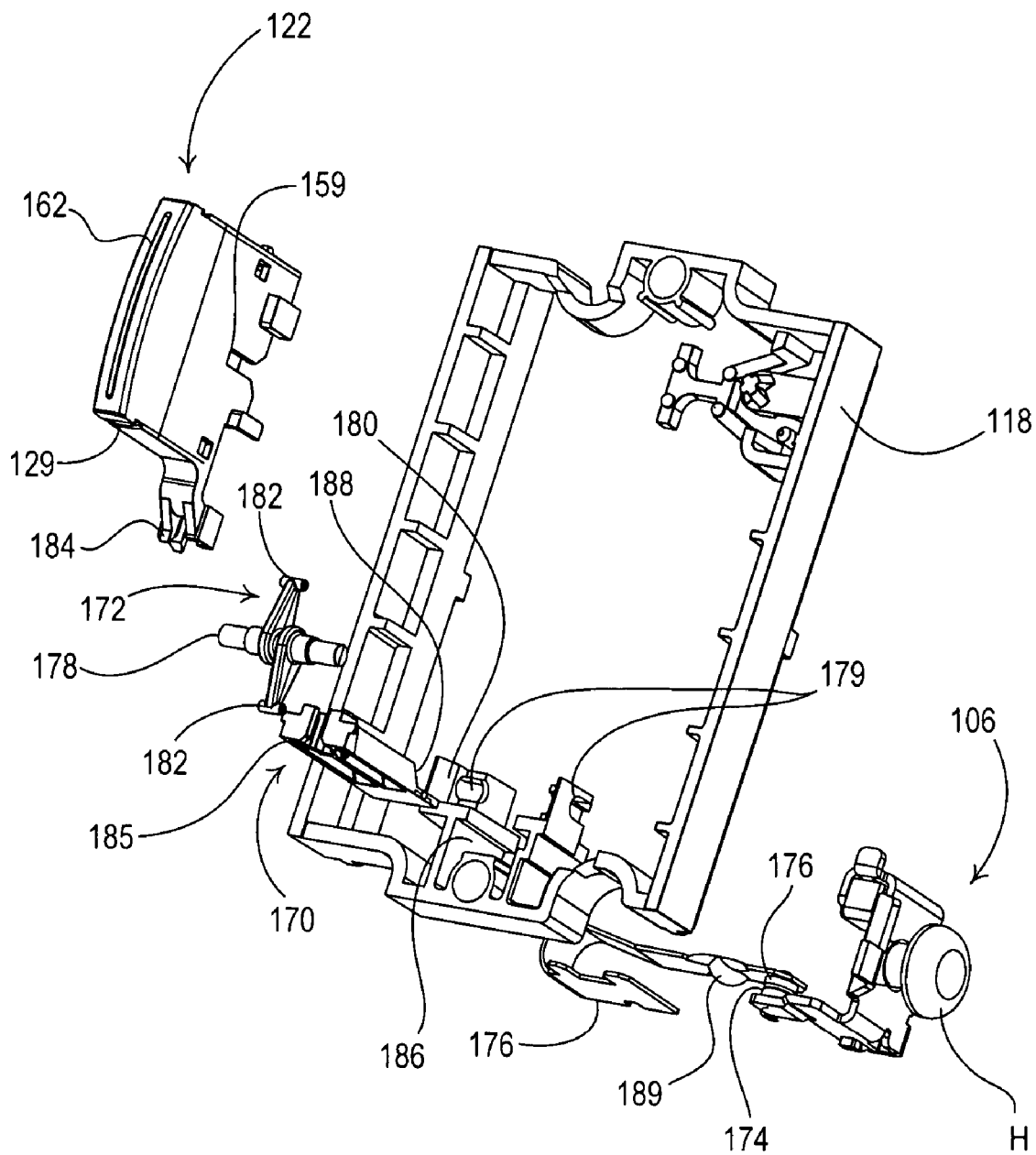

FIGS. 9A and 9B are first and second exploded views of the air-gap actuator assembly of the dimmer switch 100. The control actuator 122 is mechanically coupled to an air-gap shaft 170 (i.e., a cam) via an air-gap lever 172. The air-gap switch 106 includes a first electrical contact 174 connected to the hot terminal H and a second electrical contact 175 connected to a switch leaf 176. The switch leaf 176 is connected to the PCB 140 to allow the semiconductor switch 130 to be coupled to the AC power source 102. The electrical contacts 174, 175 of the air-gap switch 106 are normally closed, such that the dimmer switch 100 is electrically coupled between the AC power source 102 and the electrical load 104 in a normal state.

The lever 172 includes posts 178, which are rotatably coupled to lever supports 179 on the ring portion 118 of the back enclosure. The ring portion 118 includes beveled edges 180, which allow the posts 178 to be snapped into the lever supports 179 during manufacturing of the dimmer switch 100. The lever 172 also includes cylindrical ends 182, which are slidingly received by a first attachment portion 184 on the control actuator 122 and a second attachment portion 185 on the shaft 172. The shaft 172 slides through a channel 186 in the ring portion 118 along a second axis of travel, which is offset in an orthogonal direction from the first axis of travel of the control actuator 122. Specifically, the second axis of travel is parallel to the first axis of travel and offset in both a lateral direction and a longitudinal direction.

When the air-gap switch 106 is closed and the electrical contacts 174, 175 are connected, the control actuator 122 is in a normal position (as shown in FIGS. 5-7). When the control actuator 122 is pulled out away from the front surface of the dimmer switch 100 (into an air-gap open state), the lever 172 operates to push the shaft 170 towards the air-gap switch. Specifically, a contact portion 188 of the shaft 170 contacts a bump 189 on the air-gap switch 106 near the second electrical contact 175. Accordingly, the second electrical contact 175 is moved away from the first electrical contact 174, thereby breaking the electrical connection and providing an air-gap break between the AC power source 102 and the electrical load 104.

A detent spring 190 is provided to hold the control actuator 122 in either the normal state or the air-gap open state. The detent spring 190 is connected to the frame 125, e.g., an opening 192 in the detent spring is ultrasonically-staked or heat-staked to a post (not shown) on the rear side of the frame. An arm 194 of the detent spring 190 extends from the opening 190 to a lower contact portion 196 and an upper contact portion 198.

While the air-gap switch 106 is closed, the lower contact portion 196 of the detent spring 190 contacts the upper surface of the extension 148 of the control actuator 122 to hold the control actuator in the normal state. When the control actuator 122 is pulled out from the dimmer switch 100, the arm 194 of the detent spring 190 flexes away from the control actuator 122, i.e., towards the left as shown in FIG. 5. After the extension 148 of the control actuator 122 moves past the detent spring 190, the arm 194 forces the detent spring back towards the control actuator. The upper contact portion 198 contacts the lower surface of the extension 148 such that the control actuator 122 is held in the air-gap open state. Thus, an actuation of the control actuator 122 to actuate the air-gap switch 106 (i.e., pulling the control actuator away from the dimmer switch 100) requires a greater force and a greater displacement of the control actuator than the transitory actuation of the control actuator 122 to control the lighting load 104.

While the present invention has been described with reference to a dimmer switch 100, the concepts of the present invention could be applied to any type of load control device having a user interface provided in an opening of a traditional-style faceplate. For example, the dimmer switch 100 may comprise a fan speed control device or an electrical timer device, which is operable to turn off the connected electrical load after a predetermined amount of time after the electrical load is turned on. An electrical timer is described in greater detail in commonly-assigned co-pending U.S. patent application Ser. No. 11/521,234, filed Sep. 13, 2006, entitled WALL-MOUNTABLE TIMER FOR AN ELECTRICAL LOAD, the entire disclosure of which is hereby incorporated by reference.

Further, the dimmer switch 100 could be included as part of a lighting control system. Therefore, the dimmer switch 100 could also include a communication circuit to allow the dimmer switch 100 to transmit and receive digital messages on a communication link, e.g., a wired communication link, a power-line carrier (PLC) communication link, or a wireless communication link, such as a radio-frequency (RF) communication link or an infrared (IR) communication link. Examples of RF lighting control systems are described in greater detail in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and commonly-assigned U.S. Pat. No. 6,803,728, issued Oct. 12, 2004, entitled SYSTEM FOR CONTROL OF DEVICES. An example of a lighting control system having an IR communication link is described in greater detail in commonly-assigned U.S. Pat. No. 6,300,727, issued Oct. 9, 2001, entitled LIGHTING CONTROL WITH WIRELESS REMOTE CONTROL AND PROGRAMMABILITY. An example of a power-line carrier communication system using a current-carrier technique is described in greater detail in U.S. patent application Ser. No. 11/447,431, filed Jun. 6, 2006, entitled SYSTEM FOR CONTROL OF LIGHTS AND MOTORS. The entire disclosures of all of the above-referenced patents and patent applications are hereby incorporated by reference.

Although the word "device" has been used to describe the elements of the dimmer of the present invention, it should be noted that each "device" described herein need not be fully contained in a single enclosure or structure. For example, a control actuator having the linear array of status indicators may be provided on a low-voltage wallstation that communicates (directly or indirectly) with a remotely located dimmer module in a separate location, such as a power panel.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A control structure for controlling the power to be applied to an electrical system from an AC power source, said control structure comprising:
   a cover plate defining a rectangular opening therein, said rectangular opening having a length and a width;
   a first rectangular depressible control button coupleable to said electrical system to turn said system on and off, said first button disposed adjacent one side of the length of said rectangular opening in said cover plate, said first button filling said length of said rectangular opening and about one-half the width of said rectangular opening in said cover plate;
   a second rectangular depressible power-increase button coupleable to said electrical system to increase the power applied to said electrical system;
   a third depressible rectangular power-decrease button coupleable to said electrical system to decrease the power applied to said electrical system, said second and third buttons being arranged within the remaining half of the width of said rectangular opening in said cover plate and extending for said length of said rectangular opening, whereby said first, second, and third buttons fill the full area of said rectangular opening in said cover plate; and
   a support frame supporting said first, second, and third buttons and provided for mounting the control structure in a standard electrical wall box;
   an air-gap switch adapted to be coupled in series with said electrical system and comprising a flexible switch leaf contact movable into and out of engagement with a cooperating contact and biased toward engagement with said cooperating contact,
   an air-gap shaft located behind said cover plate and operable to contact said air-gap switch to open said air-gap switch; and
   an air-gap lever located behind said cover plate and coupled for pivotal motion between said first button and said air-gap shaft;
   wherein said first button comprises a push pull button slidably mounted with respect to said support frame and operable to be manually pressed in a first direction toward said cover plate to turn said electrical system on and off, and to be manually pulled in a second direction away from said cover plate, said air-gap shaft operable to open said air-gap switch when said first button is pulled away from said cover plate in said second direction, said first and second directions defining a first axis of travel, said air-gap shaft moving along a second axis of travel parallel to and offset from said first axis to operate said air-gap switch.

2. The control structure of claim 1, which further comprises:
   a narrow slot centrally disposed along at least a portion of the length of said first button; and
   wherein the a linear illumination array disposed along the length of said narrow slot, said linear illumination array being energizable from said electrical system to produce a visual output along its length related to the amount of power transmitted to said electrical system in response to an actuation of either of said second or third buttons.

3. The control structure of claim 2, wherein said linear illumination array comprises a plurality of light-conducting pipes each having one end terminating within said slot and spaced along the length of said slot, and a second end coupled to respective ones of an array of light-emitting diodes disposed on a circuit board beneath said cover plate.

4. The control structure of claim 3, wherein the surfaces of said first, second, and third buttons extend through said rectangular opening in said cover plate and beyond the surface of said cover plate for convenient access by a user.

5. The control structure of claim 4, wherein said rectangular opening in said cover plate has a length greater than its width.

6. The control structure of claim 5, wherein said rectangular opening in said cover plate has a length of about 0.925 inch and a width of about 0.401 inch.

7. The control structure of claim 4, wherein said surfaces of said second and third buttons define a single continuous appearance surface having a positive curvature above the plane of said cover plate.

8. The control structure of claim 4, wherein at least the length-wise edges of said surfaces of said first, second, and third buttons are chamfered.

9. The control structure of claim 2, wherein said electrical system is one of a dimmable lighting load or motor control.

10. The control structure of claim 1, further comprising:
    a thin shroud integral with and extending from said support frame and into the peripheral sides of said rectangular opening in said cover plate, the walls of said shroud being disposed between said rectangular opening in said cover plate and the laterally outermost side surfaces of said first, second, and third buttons, the top surfaces of said first and second buttons, and the bottom surfaces of said first and third buttons, so as to prevent the binding of said first, second, and third buttons due to a planar displacement of said cover plate relative to said frame.

11. The control structure of claim 10, wherein the surfaces of said first, second, and third buttons extend through said rectangular opening in said cover plate and beyond the surface of said cover plate for convenient access by a user.

12. The control structure of claim 11, wherein said surfaces of said second and third buttons define a single continuous appearance surface having a positive curvature above the plane of said cover plate.

13. The control structure of claim 12, wherein at least the length-wise edges of the surfaces of said first, second, and third buttons are chamfered.

14. The control structure of claim 10, further comprising:
    a narrow slot centrally disposed along at least a portion of the length of said first button; and
    a linear illumination array disposed along the length of said narrow slot and visible from the front surface of said cover plate, said linear illumination array being energizable from said electrical system to produce a visual output along its length related to the amount of power transmitted to said electrical system in response to actuations of either of said second or third buttons.

15. The control structure of claim 14, wherein said linear illumination array comprises a plurality of light-conducting pipes each having one end terminating within said slot and spaced along the length of said slot, and a second end coupled to respective ones of an array of light-emitting diodes disposed on a circuit board beneath said cover plate.

16. The control structure of claim 10, wherein said rectangular opening in said cover plate has a length greater than its width.

17. The control structure of claim 16, wherein said rectangular opening in said cover plate has a length of about 0.925 inch and a width of about 0.401 inch.

18. The control structure of claim 1, wherein said electrical system is one of a dimmable lighting load or motor control.

19. A control structure for controlling the power to be applied to an electrical system, said control structure comprising:
- a cover plate which contains a rectangular opening therein;
- a support frame supporting a rectangular control button which is coupleable to said electrical system and manually movable for toggling said electrical system on and off in response to operation of said rectangular control button;
- a power control actuator fixed relative to said cover plate and coupleable to and manually operable to control the power applied to said electrical system;
- a linear illumination array disposed along the center of the surface of said rectangular control button and electrically energized from said electrical system to produce a visual output along its length which is related to the amount of power transmitted to said electrical system in response to an actuation of said power control actuator;
- an air-gap switch adapted to be coupled in series with said electrical system and comprising a flexible switch leaf contact movable into and out of engagement with a cooperating contact and biased toward engagement with said cooperating contact;
- an air-gap shaft located behind said cover plate and operable to contact said air-gap switch to open said air-gap switch; and
- an air-gap lever located behind said cover plate and coupled for pivotal motion between said rectangular control button and said air-gap shaft;
- wherein said rectangular control button comprises a push pull button slidably mounted with respect to said support frame and operable to be manually pressed in a first direction toward said cover plate to turn said electrical system on and off, and to be manually pulled in a second direction away from said cover plate, said air-gap shaft operable to open said air-gap switch when said rectangular control button is pulled away from said cover plate in said second direction, said first and second directions defining a first axis of travel, said air-gap shaft moving along a second axis of travel parallel to and offset from said first axis to operate said air-gap switch.

20. The control structure of claim 19, wherein said surface of said rectangular control button contains a slot, and said linear illumination array comprises a plurality of light-conducting pipes each having one end terminating within said slot and spaced along the length of said slot, and a second end coupled to respective ones of an array of light-emitting diodes disposed on a circuit board disposed beneath said cover plate.

21. The control structure of claim 19, wherein said electrical system is one of a dimmable lighting load or motor control.

22. The control structure of claim 19, wherein said rectangular opening in said cover plate has a length greater than its width.

23. A control structure for controlling the power to be applied to an electrical system, said control structure comprising:
- a cover plate which contains a rectangular opening therein, said rectangular opening having a length and a width;
- a first rectangular depressible push-pull control button disposed adjacent one side of the length of said rectangular opening in said cover plate, said first button filling said length of said rectangular opening and about one half the width of said rectangular opening in said cover plate, said first button operable to be manually pressed toward said cover plate and pulled away from said cover plate along a first axis of travel to turn said electrical system on and off;
- a second rectangular depressible power-increase button coupled to said electrical system to increase the power applied to said electrical system;
- a third depressible rectangular power-decrease button coupled to said electrical system to decrease the power applied to said electrical system, said second and third buttons being stacked atop one another within the remaining half of the width of said rectangular opening in said cover plate and extending for said length of said rectangular opening, whereby said first, second and third buttons fill the full surface of said rectangular opening in said cover plate;
- a support frame supporting said first, second, and third buttons;
- an air-gap switch connected in series with said electrical system, said air-gap switch comprising a flexible switch leaf contact movable into and out of engagement with a cooperating contact and biased toward engagement with said cooperating contact; and
- an operating mechanism located behind said cover plate and connected between said air-gap switch and said first button, said operating mechanism including a shaft operable to travel along a second axis of travel and to contact said air-gap switch to open said air-gap switch, said operating mechanism further comprising a centrally pivoted lever having a first end coupled to said first button and a second end connected to said shaft, whereby the shaft is movable along a second axis of travel to separate said leaf contact from said cooperating contact when said push-pull button is pulled out by said user and to permit said leaf contact to press into contact with said cooperating contact when said push-pull button is pushed in by the user;
- wherein said second axis of travel is parallel to and offset in an orthogonal direction from said first axis of travel.

24. The control structure of claim 23, wherein said electrical system is one of a dimmable lighting load or motor control.

25. The control structure of claim 23, wherein said rectangular opening in said cover plate has a length greater than its width.

26. The control structure of claim 23, wherein said rectangular opening in said cover plate has a length of about 0.925 inch and a width of about 0.401 inch.

27. The control structure of claim 23, wherein the lengthwise edges of said second and third buttons are chamfered.

28. An operating mechanism for an air-gap switch in a wall-mounted load control device for controlling the power delivered from an AC power source to an electrical load, said load control device comprising a yoke for mounting said load control device to a standard electrical wall-box, said air-gap switch adapted to be coupled in series between said AC power source and said electrical load, said air-gap switch comprising a flexible switch leaf contact movable into and out of engagement with a cooperating contact and biased toward engagement with said cooperating contact, said operating mechanism comprising:

a push-pull button slidably mounted with respect to said yoke and extending beyond said yoke of said load control device, said push-pull button operable to be pressed inward or pulled outward by a user along a first axis of travel;

a centrally pivoted lever located behind said yoke and having a first end coupled to said push-pull button and a second end; and a cam located behind said yoke and connected to said second end of said lever, said cam being movable along a second axis of travel to separate said leaf contact from said cooperating contact when said push-pull button is pulled out by said user and to pen it said leaf contact to press into contact with said cooperating contact when said push-pull button is pushed in by said user;

wherein said second axis of travel is parallel to and offset in an orthogonal direction from said first axis of travel.

29. The operating mechanism of claim 28, further comprising:

a toggle linkage and spring connected between said cam and said leaf contact for toggling said leaf contact into and out of contact with said cooperating contact in response to the operation of said push-pull button.

30. The operating mechanism of claim 28, wherein said load control device is adapted to have a cover plate fixed to said yoke, said cover plate having a rectangular opening, said push-pull button extending through said opening for operation by said user.

31. The operating mechanism of claim 30, further comprising:

variable power control operator means fixed to said yoke and having a power control button extending through said cover plate for adjusting the power delivered to said load between said on and off conditions.

32. A control structure for an electrical circuit for controlling the power to be applied to an electrical system from an AC power source, said control structure comprising:

a toggle button having a rectangular hollow plastic body with a translucent outer top surface;

a support structure for supporting said toggle button for linear motion between first and second positions related to switch on and switch off positions;

a light pipe structure supported within said hollow plastic body of said toggle button, said light pipe structure having a first end surface facing an interior surface of said translucent outer top surface and a second end surface opposite to said first end surface; at least one light-emitting diode facing said second end surface for illuminating said second end surface whereby the light illumination on said second end surface is conducted to said first end surface to illuminate said translucent outer top surface; and a circuit for energizing said at least one light-emitting diode when said electrical circuit is off;

wherein said light pipe comprises a plurality of spaced pipes which merge together at said first end surface of said light pipe, each of said pipes merging with one another over a concave curvature selected to increase the uniformity of illumination of said first end surface.

33. The control structure of claim 32, wherein each of said spaced pipes have a bottom end, and one of a plurality of light-emitting diodes is disposed adjacent each of said bottom ends.

34. A load control device for controlling the amount of power delivered to an electrical load from an AC power source, said load control device comprising:

a yoke for mounting said load control device to a standard electrical wall-box;

a controllably conductive device operable to be coupled in series electrical connection between said AC power source and said electrical load, said controllably conductive device having a control input for controlling said controllably conductive device between a non-conductive state and a conductive state;

an air-gap switch coupled in series electrical connection with said controllably conductive device, said air-gap switch operable to electrically connect said AC power source and said electrical load through said controllably conductive device when said air-gap switch is in a closed state and operable to provide an air-gap break between said AC power source and said electrical load when said air-gap switch is in an open state;

said air-gap switch comprising a flexible switch leaf contact movable into and out of engagement with a cooperating contact and biased toward engagement with said cooperating contact;

a controller operatively coupled to said control input of said controllably conductive device for controlling said controllably conductive device between said non-conductive state and said conductive state;

a control actuator adapted to be provided in an opening of a traditional-style faceplate and to extend beyond a front surface of said faceplate, said controller operable to control the amount of power delivered to said electrical load in response to an actuation of said control actuator, said control actuator further coupled to said air-gap switch to control said air-gap switch between said closed state and said open state;

a visual display provided on a front surface of said actuator, said controller operable to control said visual display to display a representation of the amount of power being delivered to said electrical load; and said control actuator comprising a push-pull button slidably mounted with respect to said yoke and extending beyond said yoke of said load control device, said push-pull button operable to be pressed inward or pulled outward by a user along a first axis of travel; further comprising:

a centrally pivoted lever located behind said yoke and having a first end coupled to said push-pull button and a second end; and a cam located behind said yoke and connected to said second end of said lever, said cam being movable along a second axis of travel to separate said leaf contact from said cooperating contact when said push-pull button is pulled out by said user and to permit said leaf contact to press into contact with said cooperating contact when said push-pull button is pushed in by said user;

wherein said second axis of travel is parallel to and offset in an orthogonal direction from said first axis of travel.

35. The load control device of claim 34, wherein said visual display comprises a linear array of status indicators.

36. The load control device of claim 35, further comprising:

a plurality of light sources mounted inside said load control device; and a plurality of light pipes received within said control actuator, said light pipes operable to conduct the light from each of said plurality of light sources to said front surface of said actuator.

37. The load control device of claim 36, wherein said visual display further comprises a status indicator lens provided on said front surface of said actuator.

38. The load control device of claim 37, wherein each light pipe is operable to conduct the light from one of said light sources to provide a point of illumination on said status indicator lens.

39. The load control device of claim 38, wherein the light from each of said light sources is diffused around said point of illumination on said status indicator lens.

40. The load control device of claim 34, wherein said second axis of travel is offset in both a longitudinal direction and a lateral direction from said first axis of travel.

41. The load control device of claim 34, further comprising:
a raise actuator, said controller operable to increase the amount of power delivered to said electrical load in response to an actuation of said raise actuator;
a lower actuator, said controller operable to decrease the amount of power delivered to said electrical load in response to an actuation of said lower actuator;
wherein said control actuator, said raise actuator, and said lower actuator are adapted to be provided together in said opening of said traditional-style faceplate.

42. The load control device of claim 41, further comprising: a frame surrounding said control actuator, said raise actuator, and said lower actuator, said frame adapted to fit within said opening of said traditional-style faceplate.

43. The load control device of claim 34, wherein said controllably conductive device comprises a bidirectional semiconductor switch.

44. The load control device of claim 34, wherein said controller comprises a microprocessor.

45. A load control device for controlling the amount of power delivered to an electrical load from an AC power source, said load control device comprising:
an actuator having a front surface and adapted to be provided in an opening of a traditional-style faceplate; and
a status indicator lens provided on said front surface of said actuator, said status indicator lens providing a linear array of status indicators located on said front surface of said actuator;
a plurality of spaced light sources mounted inside said load control device; and
a plurality of light pipes received within said actuator and forming a light pipe structure, said light pipe structure having a first end surface facing an interior surface of said front surface of said actuator and a second end surface opposite to said first end surface;
said light pipes operable to conduct the light from each of said plurality of light sources to said front surface of said actuator, said light pipes coupled to said status indicator lens via a plurality of concave curvatures;
wherein said plurality of spaced light pipes merge together at said first end surface, each of said pipes merging with one another over a concave curvature selected to increase the uniformity of illumination of said first end surface;
wherein said load control device is operable to control the amount of power delivered to said load in response to an actuation of said actuator.

46. A light pipe structure for conducting light from a plurality of discrete sources, said light pipe structure comprising:
a continuous front surface;
a plurality of spaced light pipes coupled to said continuous front surface, such that said light pipes are each operable to conduct the light from one of said discrete sources to the front surface;
said light pipes form a light pipe structure having a first end surface facing an interior surface of said front surface and a second end surface opposite to said first end surface,
wherein said light pipes are coupled to said front surface via a plurality of concave structures and said light pipe structure provides optical coupling between said light pipes to provide a diffusion of the light from said discrete sources at said front surface;
wherein said plurality of spaced light pipes merge together at said first end surface of said light pipe structure, each of said pipes merging with one another over a concave curvature selected to increase the uniformity of illumination of said first end surface.

47. The light pipe structure of claim 46, wherein said front surface is curved.

48. The light pipe structure of claim 46, wherein said continuous front surface comprises a status indicator lens.

49. The light pipe structure of claim 48, wherein said light pipes are received in a control actuator of a load control device such that said status indicator lens is provided at a front surface of said control actuator.

50. A load control device for controlling the amount of power delivered to an electrical load from an AC power source, said load control device comprising:
a yoke for mounting said load control device to a standard electrical wall box,
a controllably conductive device operable to be coupled in series electrical connection between said AC power source and the electrical load, said controllably conductive device having a control input for controlling said controllably conductive device between a non-conductive state and a conductive state;
an air-gap switch coupled in series electrical connection with said controllably conductive device and operable to be coupled in series electrical connection between said AC power source and said electrical load, said air-gap switch operable to electrically connect said AC power source and said electrical load through said controllably conductive device when said air-gap switch is in a closed state and operable to provide an air-gap break between said AC power source and said electrical load when said air-gap switch is in an open state;
said air-gap switch comprising a flexible switch leaf contact movable into and out of engagement with a cooperating contact and biased toward engagement with said cooperating contact;
a controller operatively coupled to said control input of said controllably conductive device for controlling said controllably conductive device between said non-conductive state and said conductive state; and
a control actuator adapted to be provided in an opening of a traditional-style faceplate and to extend beyond a front surface of said faceplate, said control actuator comprising a push-pull button slidably mounted with respect to said yoke and extending beyond said yoke of said load control device, said push-pull button operable to be pressed inward or pulled outward by a user along a first axis of travel;
said controller operable to control the amount of power delivered to said electrical load in response to a first inward actuation of said control actuator, said control actuator further coupled to said air-gap switch to control said air-gap switch between said closed state and said open state in response to a second outward actuation of said control actuator, said second actuation characterized by a greater force and a greater displacement of said control actuator than said first actuation;

said load control device further comprising:

a centrally pivoted lever located behind said yoke and having a first end coupled to said push-pull button and a second end; and a cam located behind said yoke and connected to said second end of said lever, said cam being movable along a second axis of travel to separate said leaf contact from said cooperating contact when said push-pull button is pulled out by said user and to permit said leaf contact to press into contact with said cooperating contact when said push-pull button is pushed in by said user;

wherein said second axis of travel is parallel to and offset in an orthogonal direction from said first axis of travel.

51. The operating mechanism of claim 28, wherein said second axis of travel is parallel to and offset in both a longitudinal direction and a lateral direction from said first axis of travel.

* * * * *